May 29, 1928.
E. H. C. J. PARLONGUE
1,671,207
MOVING FOOTWAY
Filed Sept. 23, 1926
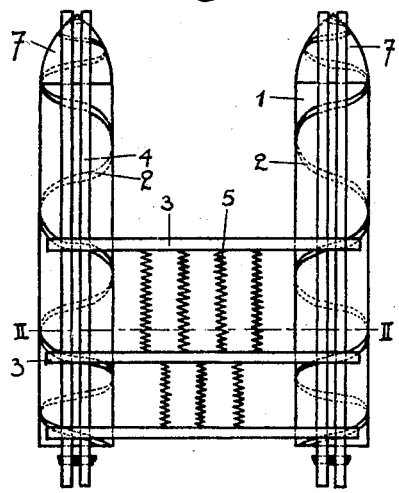
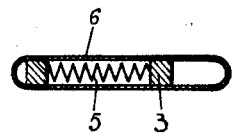
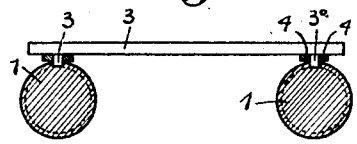
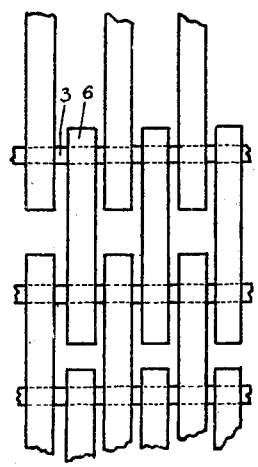
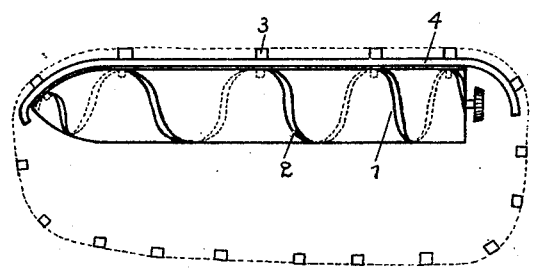
Inventor:
Edgard Henri Charles Joseph Parlongue
By
Attorney Patented May 29, 1928.

1,671,207

UNITED STATES PATENT OFFICE.

EDGARD HENRI CHARLES JOSEPH PARLONGUE, OF BRUSSELS, BELGIUM.

MOVING FOOTWAY.

Application filed September 23, 1926, Serial No. 137,294, and in France October 12, 1925.

The present invention relates to moving footways and more particularly to devices for assisting passengers in stepping on and off moving footways.

The principal difficulty encountered in the ordinary types of moving footways consists in constructing devices for assisting passengers in stepping on and off. The passengers must, in fact, be taken from the stationary platform to the footway, or carried to the stationary landing platform from the moving footway at a sufficiently gradual increasing or decreasing speed not only so that they may easily keep their balance but also so that they will not even experience discomfort.

Devices for stepping on and off have already been employed which are formed of rows of members such as rollers, the respective speeds of which increase or decrease uniformly so as to make the acceleration or deceleration in the speed at which the passenger is carried along almost continuous.

But in practice the efficiency of such devices is only approximate since, unless the number of stepped speed members is increased beyond acceptable limits, the speed of travel of the passenger varies distinctly from one member to another, so that the acceleration or deceleration in the speed is always produced in jerks which are extremely unpleasant for the passenger.

The object of the present invention is to obviate these sudden changes, and for this purpose the invention consists in connecting the members carrying the passenger along at increasing or decreasing speeds in groups of two or more, by means of extensible surfaces forming endless belts upon which the passenger is supported.

The accompanying drawing illustrates diagrammatically by way of example, one form of the device according to the invention.

Figure 1 is a plan view.

Figure 2 is a cross section taken along the line II—II in Figure 1.

Figure 3 is a side view.

Figure 4 is a detail view in longitudinal section, to a larger scale.

Figure 5 is a plan view of a part, also showing this same detail in plan.

Each element of the device comprises two similar and parallel cylinders 1 rotated in opposite directions at the same speed. Upon the surface of each of these cylinders is formed a helical grooove 2 the pitch of which varies uniformly from one end to the other. The pitch of the groove in one of the cylinders is exactly the reverse of that of the groove in the other cylinder. Rods 3 disposed transversely between the cylinders 1 are provided at their ends with projections 3ª which engage in the grooves in these cylinders and slide in the double guide 4 which is parallel to the axis of these same cylinders.

The rods 3 are connected to each other by rows of springs 5 (Fig. 1) connected to the successive rods in a staggered formation. Each spring 5 is enclosed in a small casing 6 (Fig. 4) which allows free play to the rods 3 upon its lateral faces. These rods 3 slide with slight friction in the casings 6 and support the same during such movement. On account of the staggered arrangement of the springs, the casings extending from one rod to the next, project between the casings which connect the latter rod with the succeeding one (Fig. 5) in such a way as to form an endless continuous surface.

The latter becomes gradually stretched when the rods travel along the length of the cylinders in the direction of increasing pitch of their grooves. Its gradual expansion may be obtained by means of grooves in the form of conical helices formed in the surface of parts 7 of decreasing diameter which terminate the cylinders 1.

The width of the surface is such that a person of more than ordinary corpulence will be able to stand on it easily. By coupling side by side several elements such as the one described above the surface may be made wide enough for a number of people to pass along the footway at the same time, or descend therefrom.

Following the stepping-on device is an auxiliary surface, contiguous to the footway and moving parallel to and at the same speed as the latter. The passenger can therefore step easily from this auxiliary surface to the footway proper. The stepping-off device is preceded by a similar auxiliary surface upon which the passenger passes when leaving the footway. The auxiliary surfaces employed will have a length of 40 or 50 meters.

The stepping-off device may be similar to the stepping-on device above described but constructed so as to produce a uniformly retarded movement.

Naturally, even with regard to the variable pitch screw device, the invention is not limited to the constructional details given. Thus, for example, the cylinders with helical grooves may have a fairly large diameter and have traced upon them two or more grooves so as to reduce their speed of rotation and the distance between the rods provided with projecting pieces.

Moreover, the invention is not rigidly limited to this form of construction, but includes any modification based upon the same principle.

What I claim as my invention and desire to secure by Letters Patent is:

1. A device for assisting passengers in stepping on and off moving footways, comprising a set of members for carrying the passengers at continuously increasing or decreasing speeds, and an extensible surface forming endless bands for connecting said members in groups.

2. A device for assisting passengers in stepping on and off moving footways, comprising rotatable shafts upon which are mounted variable pitch screws, parallel bars disposed transversely of the said shafts and connected together by sets of springs, projections on said bars engaging in the screws of the shafts, and extensible surfaces connecting said bars and forming endless bands.

In testimony whereof I affix my signature.

EDGARD HENRI CHARLES JOSEPH PARLONGUE.